United States Patent Office 3,383,399
Patented May 14, 1968

3,383,399
SALTS OF BORON-HYDRIDE ANIONS AND BORON CONTAINING ORGANIC CATIONS AND METHOD OF THEIR PREPARATION
Stanley Frank Stafiej, Springdale, and Edward Andrew Takacs, South Norwalk, Conn., assignors to American Cyanamid Company, Stamford, Conn., a corporation of Maine
No Drawing. Filed Mar. 9, 1964, Ser. No. 351,586
7 Claims. (Cl. 260—453)

ABSTRACT OF THE DISCLOSURE

Salts of boron-containing cations and boron-containing anions, their method of preparation by the metathetical reaction of other salts of boron-containing cations with boron-hydride salts and their use as high energy solid rocket propellant ingredients, burning rate modifiers for rocket propellants, and boron-containing gasoline additives are disclosed.

---

This reaction may be represented by the following equation:

I. 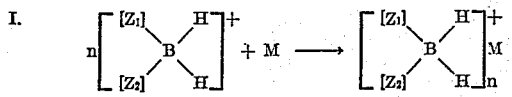

wherein $[Z_1]$ and $[Z_2]$ are each ligands selected from the group consisting of tertiary amines in which the nitrogen atom is bonded only to carbon atoms and not more than one nitrogen atom of another amine radical, nitriles, dialkyl sulfides, and tertiary phosphines in which the phosphorus is bonded only to carbon atoms; wherein M is a boron-hydride anion, such as $B_9H_{14}^-$, $B_3H_8^-$, $B_{10}H_{10}^=$, $B_{12}H_{12}^=$, $B_{10}H_{14}^=$, $BH_4^-$, $B_{10}H_{13}\cdot N_2H_4^-$, $B_{10}H_{13}\cdot NH_3^-$, and $B_{10}H_{13}C\equiv N^=$; and $n$ is a positive integer equal to the valence of the boron-hydride anion.

The boron-containing cation useful for performing the reaction of the present invention may have associated with it any anion which will not interfere with the above reaction, such as the chloride, bromide, fluoride, nitrate, chlorate, sulphate, chloroplatinate, triiodide, hexafluorometaantimoniate, tetraphenylborate, tetrachloroborate and fluophosphate anions, although it is generally preferred that the anion be the fluoroborate or perchlorate anion since the fluoroborate and perchlorate of this cation can be prepared directly from readily available starting materials by the processes described and claimed in copending applications Ser. Nos. 351,583, now U.S. Patent No. 3,305,555, issued Feb. 21, 1967 and 351,582, now U.S. Patent No. 3,296,274, issued Jan. 3, 1967, filed concurrently herewith by Stafiej and Takacs, and Stafiej and Carvalho, respectively, and assigned to the assignee of the present application.

The boron-hydride anion useful for performing the reaction of the present invention may have associated with it any cation which will not interfere with the above reaction, such as potassium, sodium, lithium, ammonium, calcium, barium, zinc, tetramethylammonium, or triphenylmethylphosphonium, etc. Thus, illustrative of the boron-hydride salts useful in the process of this invention are the following: $(CH_3)_4NB_9H_{14}$, $KB_3H_8$, $Ca(BH_4)_2$,

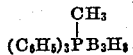

$LiB_{10}H_{13}\cdot N_2H_4$, $ZnB_{10}H_{13}C\equiv N$, $(NH_4)_2B_{10}H_{10}$ $NH_4B_{10}H_{13}\cdot NH_3$ etc.

The nucleophiles or ligands $[Z_1]$ and $[Z_2]$ may be any of the ligands described in the aforesaid copending applications Ser. Nos. 351,583, now U.S. Patent No. 3,305,555, issued Feb. 21, 1967 and 351,582, now U.S. Patent No. 3,296,274, issued Jan. 3, 1967. Thus, the nucleophile or ligand may be a tertiary amine in which the nitrogen atom is bonded only to carbon atoms of hydrocarbon or substituted hydrocarbon radicals. The tertiary amine may have the formula II. 

wherein $R_1$, $R_2$, and $R_3$ are the same or different hydrocarbon radicals or substituted hydrocarbon radicals. For example, they may be lower alkyl (e.g., methyl, ethyl, n-propyl, isopropyl, butyl, etc.), aryl (e.g., phenyl, biphenyl, naphthyl, etc.), aralkyl (e.g., benzyl, xylyl, etc.), alkaryl (e.g., tolyl, dimethyl-phenyl, ethyl-phenyl, cumenyl, etc.) or substituted forms thereof (e.g., containing one or more halogen, alkoxy, ester, thioether, etc. groups). Also, the tertiary amine may have the formula III. 

wherein $R_4$ and $R_5$ are hydrocarbon radicals or substituted hydrocarbon radicals. For example, $R_4$ may be the same as previously described for $R_1$, $R_2$, and $R_3$ and $R_5$ may be a bivalent radical which, when joined to the nitrogen atom by both valences, forms a heterocyclic ring (e.g., pyrrole, pyrrolidine, pyrroline, piperazine, piperidine, pipecoline, etc.). Further, the tertiary amine may have the formula IV. 

wherein $R_6$ is a hydrocarbon radical or substituted hydrocarbon radical which, in conjunction with the nitrogen atom, forms a heretocyclic ring (e.g., pyridine, naphthyridine, quinoline, pyrimidine, bipyridyl, etc.). Additionally, the tertiary amine may be a hydrazine derivative having the formula V. 

wherein $R_7$ and $R_8$ may be the same as $R_1$, $R_2$, or $R_3$ above.

Also, the ligand can be any of the various nitriles, e.g., lower alkylnitriles (acetonitrile, propionitrile, butyronitrile, etc.), cyanogen, lower alkylene dinitriles (malononitrile, succinonitrile, glutaronitrile, etc.). Further, the ligand can be a dialkyl sulfide, e.g., dimethyl sulfide, ethyl methyl sulfide, diethyl sulfide, substituted forms of the foregoing, etc.

Additionally, the ligand can be a tertiary phosphine in which the phosphorus atom is bonded only to carbon atoms of hydrocarbon or substituted hydrocarbon radicals and which may have any of the formulae

 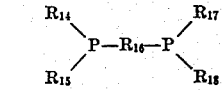

VI.    VII.    VIII.

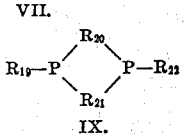

IX.

wherein $R_9$, $R_{10}$, $R_{11}$, $R_{12}$, $R_{14}$, $R_{15}$, $R_{17}$, $R_{18}$, $R_{19}$, and $R_{22}$ are monovalent hydrocarbon radicals which may be the same or different in any given formula and $R_{13}$, $R_{16}$, $R_{20}$, and $R_{21}$ are bivalent hydrocarbon radicals. These monovalent hydrocarbon radicals may be any of those previously described for $R_1$, $R_2$, or $R_3$ of Formula II. The bivalent hydrocarbon radical $R_{13}$ can be any one which, when joined to the phosphorus atom by both valences, forms a heterocyclic ring (e.g., tetramethylene, pentamethylene, $—CH_2—CH_2—O—CH_2—CH_2—$, $$—CH_2—CH_2—C_6H_4(1,2)—CH_2—$$

etc.). The bivalent hydrocarbon radicals $R_{16}$, $R_{20}$, and $R_{21}$ may be lower bivalent alkyl groups (e.g., methylene, ethylene, propylene, butylene, etc.) and, preferably, $R_{20}$ and $R_{21}$ together with two phosphorus atoms of Formula IX should add up to a five or six atom heterocyclic ring for maximum stability. $R_{16}$ may also be a bivalent aryl, alkaryl, or aralkyl group (e.g., o-phenylene, m-phenylene, p-phenylene, o-xylylene, m-xylylene, p-xylylene, toluylene, naphthylene, etc.). Illustrative of ligands useful in the process of this invention are the following:

$(CH_3)_3N$, $C_6H_5N(CH_3)_2$

$CH_3C≡N$, $N≡C—C≡N$, $N≡C—CH_2—C≡N$, $(CH_3)_2S$, $CH_3SC_2H_5$, $(CH_3)_3P$, $C_6H_5P(CH_3)_2$,

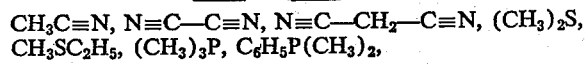

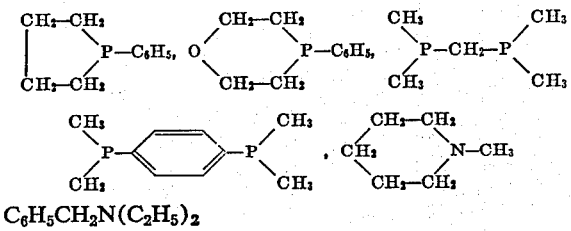

$C_6H_5CH_2N(C_2H_5)_2$

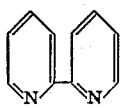

$(C_2H_5)_3N$, $(CH_3)_2NCH_2CH_2N(CH_3)_2$, etc.

All of the foregoing nucleophiles or ligands have been listed in their simplest forms, but substituted forms thereof may also be used. Thus, they may contain fluorine, chlorine, bromine, or iodine atoms, ether linkages, ester linkages, alkoxy groups, thioether linkages, and other substituents attached thereto provided they do not adversely affect the desired reaction. Also, they may include additional nucleophilic portions providing a plurality of positions to which boron atoms can be secured by ligand linkages.

Also, the ligands can be those described in our copending application Ser. No. 351,584, now U.S. Patent No. 3,341,582, issued Sept. 12, 1967, filed concurrently herewith and assigned to the assignee of the present invention, which teaches reacting boron-containing cations containing nitrile groups with ethers and thioethers to produce a novel class of cations. Thus, the ligand may have the form

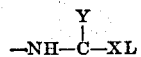

wherein Y represents a hydrocarbon or substituted hydrocarbon group, X represents —O— or —S—, and L represents a hydrocarbon or substituted hydrocarbon group. For example, the ligand may be

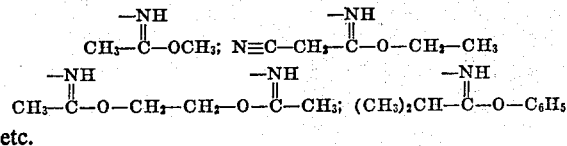

etc.

These boron-containing cations may be prepared from readily available starting materials in accordance with the teachings of the aforesaid copending applications Ser. Nos. 351,583, now U.S. Patent No. 3,305,555, issued Feb. 21, 1967; 351,582, now U.S. Patent No. 3,296,274, issued Jan. 3, 1967; and 351,584, now U.S. Patent No. 3,341,582, issued Sept. 12, 1967.

In application Ser. No. 351,583, now U.S. Patent No. 3,305,555, issued Feb. 21, 1967, one method for preparing the boron-containing cations shown on the left side of Equation I above is taught wherein a tertiary amine-borane is reacted, under anhydrous conditions, with a trityl salt and a nucleophile or ligand. In application Ser. No. 351,582, now U.S. Patent No. 3,296,274, issued Jan. 3, 1967, another method for preparing such cations is taught wherein a borohydride salt is reacted, under anhydrous conditions with at least two equivalents of a trityl salt and at least two equivalents of a nucleophile or ligand. In application Ser. No. 351,584, now U.S. Patent No. 3,341,582, issued Sept. 12, 1967, yet another method of preparing such cations is taught wherein boron-containing cations containing at least one nitrile ligand are reacted under anhydrous conditions with alcohols or mercaptans.

The boron-hydride anions useful for performing the reaction of the present invention may be prepared from various starting materials by various processes. Illustrative of such preparations are the following:

The $B_9H_{14}^-$ anion can be prepared by reacting together at room temperature decaborane with an aqueous solution of at least two molar equivalents of an alkali-metal hydroxide to form an intermediate compound which can then be reacted at room temperature, while still in the solution wherein it was formed, with a mineral acid in an amount which is one molar equivalent less than the molar equivalents of base employed to produce the $B_9H_{14}^-$ anion as taught in pending application Ser. No. 219,367, filed Aug. 22, 1962 by Benjamin, Stafieji and Takacs and assigned to the assignee of the present application.

The $B_3H_8^-$ anion can be prepared by reacting together pentaborane-9 with a basic material (such as an alkali-metal hydroxide, carbonate, methoxide, or ethoxide) in the presence of liquid water or alcohol as taught in pending application Ser. No. 343,173, filed Nov. 16, 1962 by Carvalho and Shust and assigned to the assignee of the present application.

The $B_{10}H_{10}^=$ anion can be prepared by the method described in letters by Hawthorne and Pitochelli, J.A.C.S., 81, 5519 (1959) and J.A.C.S., 82, 3228 (1960).

The $B_{12}H_{12}^=$ anion can be prepared by the method described in a letter by Pitochelli and Hawthorne, J.A.C.S. 82, 3228 (1960).

The $B_{10}H_{14}^=$ anion can be prepared by the method described by Muetterties in Inorg. Chem., 2, 647 (1963).

The $BH_4^-$ anion is a commercially available product in the form of its alkali-metal salts.

The $B_{10}H_{13} \cdot N_2H_4^-$ anion can be prepared by reacting together, in an aqueous medium, decaborane, hydrazine, and a strong base (such as alkali-metal hydroxide, hydrazine, guanidine, and mono-, di-, and tri-aminoguanidine) as taught in application Ser. No. 214,797, now U.S. Patent No. 3,281,219, issued Oct. 25, 1966, filed Aug. 1, 1962, by Takacs and assigned to the assignee of the present application.

The $B_{10}H_{13} \cdot NH_3^-$ anion can be prepared by reacting together decaborane and a large excess of ammonium hydroxide (about 12 to about 15.2 moles of ammonium hydroxide per mole of decaborane) at reduced temperature (about —20° C. to about +5° C.) as taught in abandoned application Ser. No. 220,590, filed Aug. 22, 1962 by Carvalho and assigned to the assignee of the present application.

The $B_{10}H_{13}C≡N^=$ anion can be prepared by the method described by Knoth and Muetterties in J. Inorg. and Nucl. Chem., 20, 66 (1961).

It is usually preferred to perform the reaction of this invention in the presence of an inert solvent which may be water, alcohol, etc. The reaction occurs easily and rapidly at atmosphere pressure and at room temperature or below merely upon mixing the various ingredients together. However higher or lower temperatures and pressures may be used when desired. For example, this reaction can be performed at pressures of from about 100 mm. Hg to about five atmospheres and at temperatures of from about 78° C. to about 100° C.

The two reactants may be used in stoichiometrical proportions (i.e., one equivalent of boron-containing cation for each equivalent of boron-hydride anion) or an excess (0.1 to 100 mole percent or more) of either may be used.

Examples of products of the present invention are:

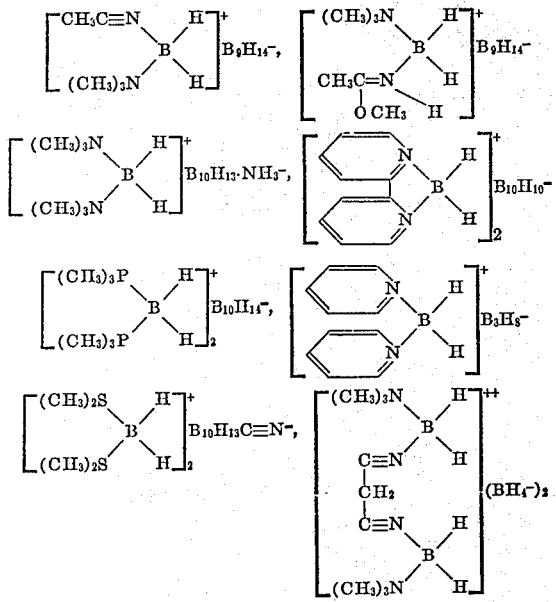

etc.

The compounds of this invention are useful as high energy solid rocket propellant ingredients, burning rate modifiers for rocket propellants, and as boron-containing gasoline additives.

For a clearer and more detailed understanding of the nature of the present invention, reference may be had to the following examples which are intended as illustrative only and not as limitations on the invention.

Example 1.—Preparation of

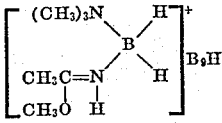

A solution of 186 mg. (1 mmole) of $(CH_3)_4NB_9H_{14}$ in 10 ml. of methanol was added to a solution of 232 mg. (1 mmole) of $[CH_3(CH_3O)C=NHBH_2N(CH_3)_3]BF_4$ in 10 ml. of methanol. After a short induction period, white dandritic crystals of $(CH_3)_4NBF_4$ settled from solution. The solution was chilled in ice for 30 minutes and filtered to yield 120 mg. (75% yield) of material. Evaporation of the filtrate to dryness yielded 220 mg. (86% yield) of a light yellow solid, M.P. 85–96° C. Three recrystallizations from methanol-water raised the melting point to 97° C.

*Analysis.*—Calculated for $C_6H_{32}N_2B_{10}O$: C, 28.09; H, 12.57; N, 10.92; B, 42.18. Found: C, 28.48; H, 12.24; N, 11.10; B, 46.78.

Example 2.—Preparation of

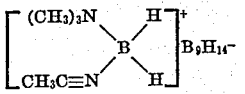

A solution of 400 mg. (2 mmoles) of $[CH_3C\equiv NBH_2N(CH_3)_3]BF_4$ in 5 ml. of water was added to a solution of 820 mg. (2 mmoles) of $KB_9H_{14}\cdot$dioxanate in 10 ml. of water. The white precipitate formed was filtered off and air dried to yield 360 mg. (80.2% yield) of product.

We claim:

1. A compound having the formula

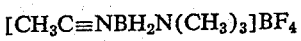

wherein $[Z_1]$ and $[Z_2]$ are each ligands of tertiary amines in which the nitrogen atom is bonded only to carbon atoms and not more than one nitrogen atom of another amine radical, nitriles, di-alkyl sulfides, or tertiary phosphines in which the phosphorous atom is bonded only to carbon atoms; wherein M is a boron-hydride anion; and $n$ is a positive integer equal to the valence of said boro-hydride anion.

2. A compound as defined in claim 1 wherein M is a boron-hydride anion of $B_9H_{14}^-$, $B_3H_8^-$, $B_{10}H_{10}^=$, $B_{12}H_{12}^=$, $B_{10}H_{14}^=$, $BH_4^-$, $B_{10}H_{13}\cdot N_2H_4^-$, $B_{10}H_{13}\cdot NH_3^-$, or $B_{10}H_{13}C\equiv N^=$.

3.

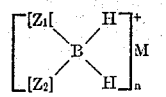

4.

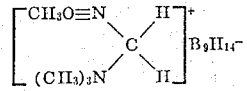

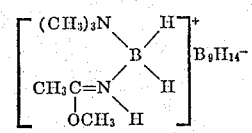

5. A process for preparing organic boron-hydride salts of boron-containing cations comprising reacting, at a pressure of about 100 mm. Hg to about 5 atmospheres and a temperature of from about −78° C. to about 100° C., a salt of a boron-containing cation with a salt of a boron-hydride anion.

6. A process for preparing boron-hydride salts of boron-containing cations comprising reacting, at a pressure of about 100 mm. Hg to about 5 atmospheres and a temperature of from about −78° C. to about 100° C., a salt of a boron-containing cation having the formula

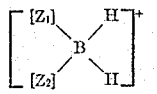

wherein $[Z_1]$ and $[Z_2]$ are each ligands of tertiary amines in which the nitrogen atom is bonded only to carbon atoms and not more than one nitrogen atom of another amine radical, nitriles, di-alkyl sulfides, or tertiary phosphines in which the phosphorus atom is bonded only to carbon atoms with a salt of a boron-hydride anion.

7. A process as defined in claim 6 wherein said boron-hydride anion is $B_9H_{14}^-$, $B_3H_8^-$, $B_{10}H_{10}^=$, $B_{12}H_{12}^=$, $B_{10}H_{14}^=$, $BH_4^-$, $B_{10}H_{13}\cdot N_2H_4^-$, $B_{10}H_{13}\cdot NH_3^-$ or $B_{10}H_{13}C\equiv N^=$.

References Cited

Parry et al.: J.A.C.S., volume 80, 1958, pages 24 to 27.

CHARLES B. PARKER, *Primary Examiner.*

JOSEPH P. BRUST, *Examiner.*

S. T. LAWRENCE III, *Assistant Examiner.*